United States Patent Office 3,152,058
Patented Oct. 6, 1964

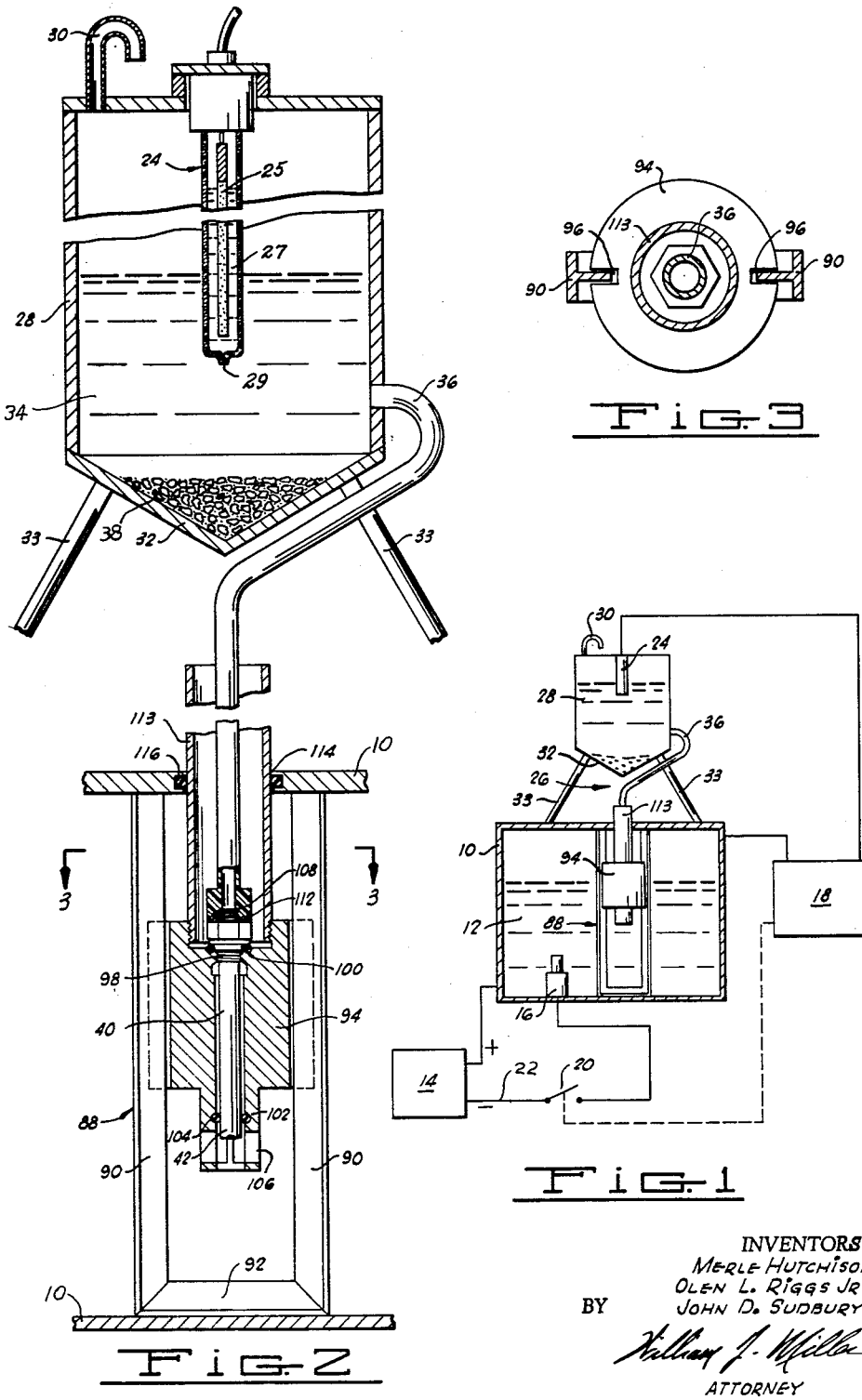

3,152,058
ELECTROLYTIC BRIDGE ASSEMBLY FOR THE ANODIC PASSIVATION OF METALS
Merle Hutchison, Olen L. Riggs, Jr., and John D. Sudbury, Ponca City, Okla., assignors to Continental Oil Company, Ponca City, Okla., a corporation of Delaware
Original application Mar. 9, 1959, Ser. No. 797,986. Divided and this application July 24, 1961, Ser. No. 126,204
5 Claims. (Cl. 204—196)

This invention relates generally to an improved system of anodic passivation for minimizing corrosion of vessels containing corrosive solutions, and more particularly, but not by way of limitation, to a novel electrolytic bridge assembly for such systems. This is a divisional application of applicants' co-pending application Serial No. 797,986, filed March 9, 1959. The latter application is a continuation-in-part of applicants' co-pending application entitled "Anodic Protection Against Corrosion," filed December 1, 1958, Serial No. 777,499, now abandoned.

The above-mentioned co-pending applications disclose a system for anodically passivating a vessel containing a corrosive solution, wherein an anodic current is passed through the solution between the walls of the vessel and an electrode supported in the solution. The amount of anodic current is controlled in accordance with the potential difference between the vessel and a standard electrode communicating electrochemically with the solution in the vessel. The corrosive solutions frequently encountered are harmful to most standard electrodes, and assurance must be had that the standard electrode does not contaminate the corrosive solution. Therefore, the standard electrode is desirably contained out of contact with the corrosive solution and is connected electrochemically with the solution by means of an electrolytic bridge. However, the electrolyte in the bridge must make positive contact with both the standard electrode and the solution under all operating conditions, such as during varying levels of the corrosive solution in the vessel being protected and during rather violent agitation of the corrosive solution. Also, as a practical matter, the electrolytic bridge must be operative for extended periods of time, without frequent attention by an operator of the process utilizing the vessel being protected.

The present invention contemplates a novel salt or electrolytic bridge assembly employing a reservoir of a suitable electrolyte positioned remote from the corrosive solution in intimate contact with a standard electrode. The electrolyte is connected to the corrosive solution through a tubular member extending into the corrosive solution to provide an electrical connection between the standard electrode and the corrosive solution. The electrolyte is gradually dripped from the tubular member into the corrosive solution to assure that a fresh supply of the electrolyte will be constantly available for making sufficient electrical contact with the corrosive solution, yet an insufficient amount of electrolyte is discharged into the corrosive solution to interfere with the process employing the corrosive solution. An excess of salt is retained in the reservoir in such a position as not to interfere with the function of the electrolytic bridge, yet retains the electrolyte at the desired concentration and facilitates the replenishing of the active electrolyte by the simple addition of water to the reservoir. The tubular member containing the electrolyte is protected within the vessel containing the corrosive solution against violent agitation of the corrosive solution, or other actions, to assure that the electrolyte will not be dumped or injected in a large quantity into the corrosive solution.

An important object of this invention is to provide an efficient system for minimizing corrosion of vessels by anodic passivation.

Another object of this invention is to provide an electrolytic bridge between the standard electrode and a corrosive solution in a vessel being protected by anodic passivation which will require a minimum of attention by an operator and which will provide an efficient electrical connection between the standard electrode and the corrosive solution under all operating conditions.

A further object of this invention is to provide an electrolytic bridge between a standard electrode and a corrosive solution contained within a vessel, without the setting up of secondary cells between the vessel and the bridge, or the supporting structure of the bridge, which would foul the monitoring of the potential difference between the standard electrode and the vessel.

Another object of this invention is to minimize deterioration of a standard electrode in an anodic passivation system, and to prevent dilution of the corrosive solution in a vessel being protected, while maintaining an efficient electrical connection between the corrosive solution and the standard electrode.

A still further object of this invention is to provide a system and electrolytic bridge assembly for the anodic passivation of metals which is simple in construction, which may be economically manufactured, and which will have a long service life.

Other objects and advantages of the invention will be evident from the following detailed description, when read in conjunction with the accompanying drawings which illustrate our invention:

In the drawings:
FIGURE 1 is a schematic illustration of a system constructed in accordance with this invention.
FIGURE 2 is a vertical sectional view through the portion of the electrolytic bridge assembly which passes through and is located in a vessel containing a corrosive solution.
FIGURE 3 is a sectional view as taken along lines 3—3 of FIG. 2.

Referring to the drawings in detail, and particularly FIG. 1, reference character 10 designates a vessel containing a corrosive solution 12 and which is to be protected by a system constructed in accordance with the present invention. The corrosive solution 12 is electrolytic and may be either acidic or alkaline. A source 14 of direct current energy is connected to the vessel 10 and to an electrode 16 positioned in the solution 12 to pass an anodic current through the solution 12 and passivate the exposed inner surfaces of the vessel 10 against the corrosive action of the solution 12.

The anodic current is controlled by any suitable type of controller 18 connected to the energy source 14 in any suitable manner, such as by means of a switch 20 interposed in the conductor 22 leading from the source 14 to the electrode 16. A type of controller 18 which may be used is shown in detail in the initially filed above-mentioned co-pending application. The controller 18 is connected across the vessel 10 and a standard electrode or electrode assembly 24 which includes a reference electrode 25 and electrolyte 27 and a capillary opening 29 that provides a liquid junction between the standard electrode and the electrolyte 34 communicating with the solution 12 as will be hereinafter described, to monitor the potential difference between the vessel 10 and the standard electrode 24. Thus, for an efficient operation of the controller 18, the standard electrode 24 must communicate electrically with the solution 12 under all operating conditions, such as during variation in the level of the solution 12 in the vessel 10 and during rather violent agitation of the solution 12, such as occurs in many processes utilizing corrosive solutions. It should also be noted at this point that the standard electrode 24 may take any desired form, such as a calomel electrode, a copper-copper sulphate electrode, a silver-silver chloride electrode or a hydrogen electrode.

The electrolytic bridge assembly for connecting the standard electrode 24 to the solution 12 is illustrated in detail in FIG. 2, and is designated generally by reference character 26 in FIG. 1. The assembly 26 comprises a reservoir 28 preferably having an air vent 30 in the upper end thereof and a tapered bottom wall 32. The reservoir 28 is supported above the level of the solution 12, as by supports 33 extending upwardly from the top of the vessel 10 (see FIG. 1). The desired electrolyte 34, such as KCl, is stored in the reservoir 28 at a level sufficient to contact a standard electrode 24 suspended from the top wall of the reservoir 28. The standard electrode 24 illustrated in FIG. 2 is a calomel electrode of the type manufactured by the Leeds and Northrup Company of Philadelphia, Pennsylvania, although it will be understood that any desired standard electrode may be used.

A conduit 36 extends through the lower portion of a side wall of the reservoir 28 so as to open into the reservoir 28 at a point well above the level of an excess of the solid salt 38 of the electrolyte deposited in the bottom of the reservoir. The excess salt 38 in the reservoir assures that the electrolytic solution will remain concentrated. The conduit 36 extends generally downward toward the vessel 10 and is threadedly connected to a weeping glass bridge 40 of any suitable type which has a restricted outlet or tip 42 at the lower end thereof. The weeping glass bridge 40 may be secured at any desired point in the vessel 10, the only requirement being that the weeping glass bridge 40 be supported in a generally vertical position with the lower end 42 thereof immersed in the solution 12.

The preferred electrolytic bridge embodiment illustrated in FIG. 2 is particularly well adapted for use in vessels wherein the level of the corrosive solution varies. A frame 88 is rigidly secured in the vessel 10 and extends from the top to the bottom of the vessel. The frame 88 has two opposed side members 90 which are preferably T-shaped in cross section as illustrated in FIG. 3. The lower ends of the members 90 may be interconnected and braced by another T-shaped member 92 if desired. A tubular head 94 is slidingly secured in the frame 88 for vertical movement upon a change in the level of the corrosive solution 12 contained in the vessel 10. Grooves 96 are formed in the opposite sides of the head 94, as illustrated in FIG. 3, to receive the inwardly extending portion of each of the frame members 90, such that the head 94 will be secured in the vessel 10 against a turning movement or a sideways movement, but will be allowed to slide vertically on the frame 88. The weeping glass bridge 40 is secured in the tubular head 94 by cooperating threads 98, and the upper end of the bridge 40 is preferably sealed in the head 94 by a suitable sealing ring 100.

A tubular extension 102 is formed on the lower end of the head 94 and extends downwardly around the bridge 40 into proximity with the lower end or tip 42 of the bridge. A suitable sealing ring 104 is secured in the extension 102 around the bridge 40 to prevent an upward flow of the corrosive solution 12 through the extension 102 and head 94. Also, openings 106 are formed in the extreme lower end portion of the extension 102 around the tip 42 to permit circulation of the solution 12 around the tip 42 in the same manner as previously described in connection with FIG. 2.

The extreme upper end 108 of the weeping glass bridge 40 is threadedly secured to the lower end of the conduit 36 extending vertically through the top of the vessel 10. Also, a sealing ring 112 is preferably provided in the lower end of the conduit 36 to seal against the upper end of the bridge 40 and prevent a leakage of electrolyte from the lower end of the conduit 36. The conduit 36 may be of any suitable construction, such as plastic. A high strength tubular member 113 is threadedly secured to the upper end of the tubular head 94 and extends upwardly around the conduit 36 through an aperture 114 in the top wall of the vessel 10. Also, a suitable sealing ring 116 is provided in the aperture 114 to sealingly engage the outer surface of the tubular member 113 and prevent a leakage of the corrosive solution 12 through the top of the vessel 10.

In operation of the electrolytic bridge assembly 26, the reservoir 28 is filled with the electrolyte 34 up to a level where the electrolyte encloses at least the major portion of the active end portion of the electrode 24 to assure intimate contact of the electrode 24 with the electrolyte. It will also be apparent that the electrolyte 34 will flow downwardly into the conduit 36 and fill both the conduit 36 and the weeping glass bridge 40.

The electrolyte 34 gradually drips from the tip 42 of the weeping glass bridge 40 into the solution 12 in the vessel 10. This gradual leakage or dripping of the electrolyte from the weeping glass bridge 40 assures that a fresh supply of the electrolyte will be constantly available at the lower end of the bridge for contact with the corrosive solution to provide an efficient junction between the electrolyte and the solution 12. However, the amount of electrolyte dripped through the tip 42 may be substantially negligible insofar as dilution of solution 12 is concerned. For example, when using a weeping glass bridge and when using KCl as the electrolyte, electrolyte will drip from the lower end of the bridge at the rate of 0.002 to 0.05 ml. per hour. It will thus be apparent that an insufficient amount of electrolyte will be mixed with the corrosive solution 12 to provide any measurable contamination of the corrosive solution 12, and that the supply of electrolyte 34 will remain available to provide electrical communication between the solution 12 and the standard electrode 24 for an extended period of time without requiring the attention of the operator of the system.

The head 94 is positioned in the frame 88 at such a level that the lower end 42 of the bridge 40 is disposed within the corrosive solution 12 contained within the vessel 10. As the level of the solution 12 varies in the vessel 10, the head 94 is raised or lowered to assure that the tip 42 is disposed within the solution 12.

It will be apparent that the height of the tubular head 94 and bridge 40 may be controlled by pulling upwardly or lowering these members, or the head 94 may be of such construction that the head will float in the solution 12 at such a depth that the tip 42 will always be disposed within the solution 12. Therefore, the upper end portion of the tubular head 94 may be maintained above the level of the solution 12 in the vessel 10 and minimize the possibility of the solution 12 leaking into the tubular member 113 and fouling operation of the apparatus. It should again be noted that the various portions of the supporting structure of the weeping glass bridge 40, such as the frame 88, tubular head 94, extension 102 and tubular member 113 should be constructed out of the same material as the vessel 10 or out of an inert material, such as various plastics, to prevent the formation of a secondary cell in the solution 12.

From the foregoing it will be apparent that the present invention provides an efficient and economical system for anodically passivating a vessel containing a corrosive solution. The electrolytic bridge of the present invention will maintain intimate communication between a standard electrode and a corrosive solution under all operating conditions, without either affecting the standard electrode or diluting the corrosive solution. Also, the tubular member providing communicator for electrolyte from the standard electrode to the corrosive solution will be protected against violent agitation of the corrosive solution, or inadvertent blows, to provide an electrolytic bridge having a long service life. It will be further apparent that a continuous and efficient junction will be provided between the electrolyte and the corrosive solution to assure that electrical communication is provided between the solution and the standard electrode. Also, the present electrolytic bridge assembly will remain operative for an extended period of time without the requirement of attention by the operator of a process employing the present invention.

Changes may be made in the combination and arrangement of parts or elements as heretofore set forth in the specification and shown in the drawings, it being understood that changes may be made in the embodiments disclosed without departing from the spirit and scope of the invention as defined in the following claims.

We claim:

1. In a system for anodically polarizing a vessel containing a corrosive solution, the combination comprising an electrode supported in the solution; a direct current energy source having a positive and negative polarity output, said negative output being connected to said electrode and said positive output being connected to said vessel for passing a direct current through the solution between the vessel and said electrode; a reservoir adapted to confine a supply of electrolyte; a standard electrode supported in the reservoir; a weeping glass bridge having a restricted tip at the lower end thereof; a tubular head surrounding and rigidly connected to the weeping glass bridge; a frame rigidly secured in said vessel and slidably engaging said tubular head to permit said tubular head and its associated weeping glass bridge to be selectively positioned relative to the surface of the solution in said vessel; a tube extending downwardly from the reservoir and connected to the upper end of said weeping glass bridge for placing the electrolyte in said reservoir in communication with said weeping glass bridge whereby an electrochemical bridge between the standard electrode and the solution in the vessel is formed; and a controller connected to the direct current energy source and across the standard electrode and the vessel for controlling said direct current in accordance with the potential difference between the standard electrode and the vessel.

2. A system as claimed in claim 1 wherein said tube is connected to a side of said reservoir to minimize the possibility of the entrance of undesirable salt into said tubular means.

3. An electrochemical bridge for coupling a standard electrode to a corrosive solution confined within a vessel comprising, a reservoir having at least side walls and a bottom and adapted to confine an electrolytic solution in contact with said standard electrode; a float means; a weeping glass bridge having a restricted outlet in one end thereof mounted in said float means and substantially normal to the surface of said corrosive solution, said weeping glass bridge being in electrochemical communication with said corrosive solution; a tubular portion rigidly secured to said weeping glass bridge and slidably inserted through a wall of said vessel; guide means rigidly secured to said wall to project inwardly into said solution and cooperating with said float means to guide said tubular portion as it is slidably reciprocated relative to said wall whereby said weeping glass bridge may be maintained in communication with the corrosive solution contained within said vessel when said corrosive solution varies in height; and means for communicating the electrolyte confined within said reservoir to the remaining end of said weeping glass bridge.

4. An electrochemical bridge as claimed in claim 3 wherein said tubular portion is slidably mounted through said vessel in substantially perpendicular relation to the surface of said corrosive solution; and further characterized to include means for slidably relocating said tubular portion in correspondence with a change in the surface level of said corrosive solution whereby said weeping glass bridge terminus is maintained in communication with said corrosive solution regardless of a variation in the surface level of said solution.

5. An electrochemical bridge adapted to be immersed a predetermined distance within a solution that varies in height, comprising a float means; a float guide means mounted normal to the surface of the solution and engaging said float means; a weeping glass bridge mounted within said float means and extending below the portion of the float means immersed within said solution; tubular means sealably secured to said float means and extending normal to said solution surface and through said vessel wall; a sealing means mounted in said vessel wall for slidably sealing said tubular means to said vessel wall whereby variations in the height of the liquid within said tank will cause a corresponding variation in the position of said float means thereby maintaining said weeping glass bridge in electrochemical communication with said solution.

References Cited in the file of this patent

UNITED STATES PATENTS 2,700,649     Hosford                Jan. 25, 1955